(12) United States Patent
Hsien

(10) Patent No.: US 10,660,489 B2
(45) Date of Patent: May 26, 2020

(54) BIODEGRADABLE MAGNETIC TOILET SEAT COVER

(71) Applicant: Chi Chen Hsien, Sacramento, CA (US)

(72) Inventor: Chi Chen Hsien, Sacramento, CA (US)

( * ) Notice: Subject to any disclaimer, the term of this patent is extended or adjusted under 35 U.S.C. 154(b) by 44 days.

(21) Appl. No.: 15/996,985

(22) Filed: Jun. 4, 2018

(65) Prior Publication Data

US 2019/0365163 A1 Dec. 5, 2019

(51) Int. Cl.
*A47K 13/18* (2006.01)
*B32B 23/04* (2006.01)
*B32B 7/12* (2006.01)
*B32B 27/22* (2006.01)
*B32B 27/30* (2006.01)
*B32B 27/06* (2006.01)

(52) U.S. Cl.
CPC .............. *A47K 13/18* (2013.01); *B32B 7/12* (2013.01); *B32B 23/04* (2013.01); *B32B 27/06* (2013.01); *B32B 27/22* (2013.01); *B32B 27/306* (2013.01); *B32B 2250/03* (2013.01); *B32B 2307/208* (2013.01); *B32B 2307/7163* (2013.01); *B32B 2307/7166* (2013.01); *B32B 2307/7265* (2013.01); *B32B 2311/22* (2013.01); *B32B 2311/30* (2013.01); *B32B 2317/16* (2013.01); *B32B 2317/18* (2013.01); *B32B 2317/20* (2013.01); *B32B 2329/04* (2013.01); *B32B 2555/00* (2013.01)

(58) Field of Classification Search
CPC ................. A47K 13/16; A47K 13/18
See application file for complete search history.

(56) References Cited

U.S. PATENT DOCUMENTS

| | | |
|---|---|---|
| 1,509,868 A | 9/1924 | Harrison |
| 3,753,262 A | 8/1973 | Watsky |
| 3,851,341 A | 12/1974 | Aoyama |
| 4,050,105 A | 9/1977 | Marceaux |
| 4,451,940 A | 6/1984 | Grunz |
| 4,887,321 A | 12/1989 | MacLean |
| 4,975,990 A | 12/1990 | Chan |

(Continued)

FOREIGN PATENT DOCUMENTS

FR 2915866 * 11/2008 ............. A47K 13/16

*Primary Examiner* — J C Jacyna
(74) *Attorney, Agent, or Firm* — Silicon Valley Patent Group LLP; Thomas C. Chan

(57) ABSTRACT

Apparatuses of a biodegradable magnetic toilet seat cover and methods for manufacturing the same are provided. In one embodiment, a biodegradable magnetic toilet seat cover includes a bottom layer configured to contact with a toilet seat, where the bottom layer is made to prevent elements on the toilet seat from permeating to a skin of a user, a top layer configured to contact with the user, where the top layer is made to provide a comfortable touch to the skin of the user, and a middle layer configured to hold the bottom layer and the top layer together, where the middle layer is further configured to hold the biodegradable magnetic toilet seat cover to the toilet seat magnetically. The biodegradable magnetic toilet seat cover may additionally or optionally include an anti-splashing flap formed with polyvinyl alcohol or viscose spunlace non-woven film, and where the anti-splashing flap is configured to prevent elements from the toilet to reach the user.

21 Claims, 11 Drawing Sheets

(56) References Cited

U.S. PATENT DOCUMENTS

| | | | |
|---|---|---|---|
| 5,437,908 A * | 8/1995 | Demura | B32B 29/02 |
| | | | 428/154 |
| 5,438,711 A | 8/1995 | Higuchi et al. | |
| 6,073,274 A * | 6/2000 | McQueen | A47K 13/16 |
| | | | 4/245.1 |
| 6,308,346 B1 | 10/2001 | Brill et al. | |
| 6,564,399 B1 * | 5/2003 | Teal | A47K 11/105 |
| | | | 4/300.3 |
| 6,813,784 B1 | 11/2004 | Thompson | |
| 6,996,859 B1 | 2/2006 | Alonso et al. | |
| 7,254,845 B1 | 6/2007 | Morad | |
| 7,707,661 B2 | 5/2010 | Issachar | |
| 8,656,523 B2 | 2/2014 | Vaniakin | |
| 2006/0258251 A1 * | 11/2006 | Konishi | A46B 3/08 |
| | | | 442/408 |
| 2007/0220664 A1 | 9/2007 | Getahun et al. | |
| 2013/0111656 A1 * | 5/2013 | Seibt | A47K 13/14 |
| | | | 4/245.4 |
| 2014/0037906 A1 * | 2/2014 | Polosa | D04H 1/49 |
| | | | 428/167 |
| 2017/0074026 A1 * | 3/2017 | Lee | C09J 123/02 |

\* cited by examiner

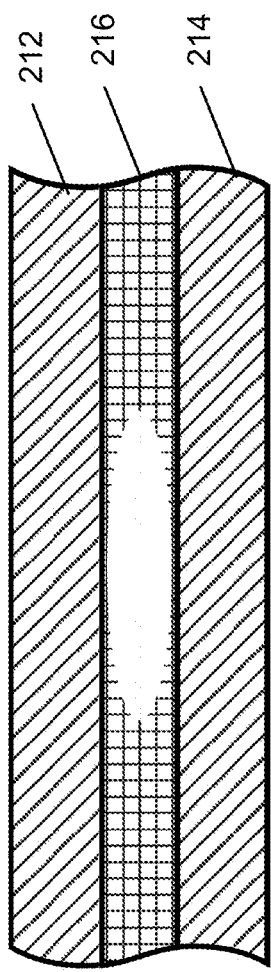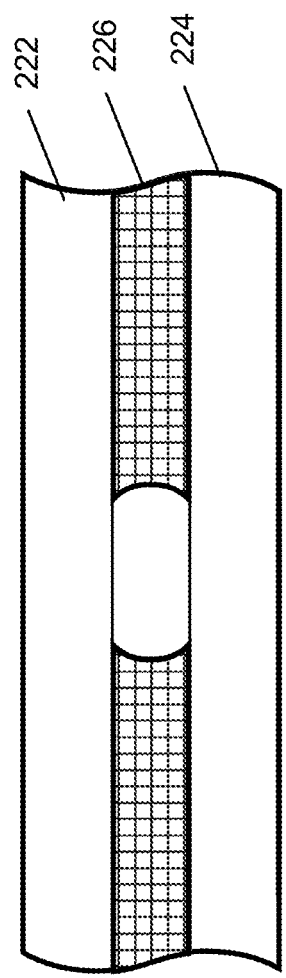
FIG. 2C
FIG. 2D

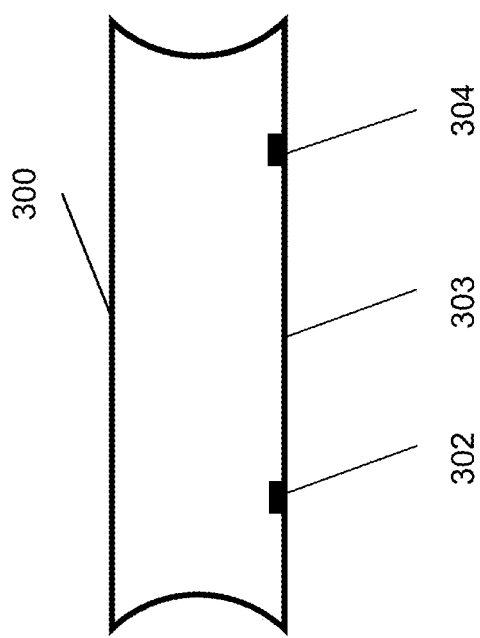
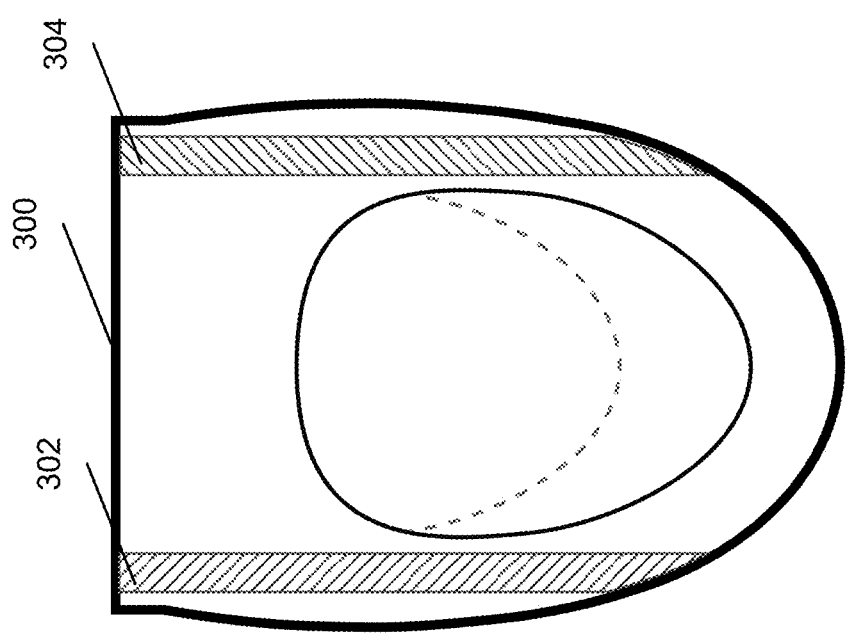
FIG. 3B
FIG. 3A

BIODEGRADABLE MAGNETIC TOILET SEAT COVER

FIELD

The present invention relates to the field of sanitary toilet seat cover. In particular, the present invention relates to apparatuses of a biodegradable magnetic toilet seat cover.

BACKGROUND

The use of public toilets can be an unpleasant experience because of the unhygienic conditions often associated with these facilities. People typically do not like to sit on a toilet seat in public restrooms that may be used by various people. Therefore, it is desirable to provide a clean and sanitary toilet seat cover that can address the hygiene issue associated with the public restrooms. Some restrooms have several types of toilet seat covers and dispensers that may be intended to protect the user against the transfer of contagious diseases that may be present on a soiled toilet seat. These toilet seat covers are made of paper and are shaped to fit the shape of the toilet seat. However, the conventional paper toilet seat covers still suffer from a number of drawbacks, such as: 1) they may break apart during unfolding the paper toilet seat cover; 2) it may not be easy to place a paper toilet seat cover at the desired position on the toilet seat as it may easily move; 3) the paper toilet seat cover may slip laterally causing exposure of a user's skin to a potentially unsanitary elements on the toilet seat; 4) water from the toilet bowl may splash onto a user's skin when the user's stools drop into the toilet; and 5) last but not least, there may be unintentionally residue liquid from the toilet seat may permeate up to the skin of the user. Thus traditional paper toilet seat covers do not provide satisfactory results of providing sanitary conditions to the user. Therefore, it is desirable to have an improved biodegradable magnetic toilet seat cover.

SUMMARY

Apparatuses of a biodegradable magnetic toilet seat cover and methods for manufacturing the same are provided. In one embodiment, a biodegradable magnetic toilet seat cover may include a bottom layer configured to contact with a toilet seat, where the bottom layer is made to prevent elements on the toilet seat from permeating to a skin of a user, a top layer configured to contact with the user, where the top layer is made to provide a comfortable touch to the skin of the user, and a middle layer configured to hold the bottom layer and the top layer together, where the middle layer is further configured to hold the biodegradable magnetic toilet seat cover to the toilet seat magnetically. The biodegradable magnetic toilet seat cover may additionally or optionally include an anti-splashing flap made with polyvinyl alcohol or viscose spunlace non-woven film, where the anti-splashing flap is configured to prevent elements from the toilet to reach the user.

In another embodiment, a method of manufacturing a biodegradable magnetic toilet seat cover may include forming a bottom layer configured to contact with a toilet seat, where the bottom layer is made to prevent elements on the toilet seat from permeating to a skin of a user, forming a middle layer configured to hold the bottom layer and a top layer together, where the middle layer is further configured to hold the biodegradable magnetic toilet seat cover to the toilet seat magnetically, and forming the top layer configured to contact with the user, where the top layer is made to provide a comfortable touch to the skin of the user. The method may additionally or optionally include attaching an anti-splashing flap to the bottom layer of the biodegradable magnetic toilet seat cover, where the anti-splashing flap is made with polyvinyl alcohol or viscose spunlace non-woven film, and where the anti-splashing flap is configured to prevent elements from the toilet to reach the user.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings.

FIG. 2A-2D illustrate cross sectional views of a biodegradable magnetic toilet seat cover according to aspects of the present disclosure.

FIG. 3A-3D illustrate exemplary implementations of a middle layer of a biodegradable magnetic toilet seat cover according to aspects of the present disclosure.

DESCRIPTION OF EMBODIMENTS

Apparatuses of biodegradable magnetic toilet seat cover and methods for manufacturing the same are provided. The following descriptions are presented to enable a person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the scope of the disclosure. Thus, the present disclosure is not intended to be limited to the examples described and shown, but is to be accorded the scope consistent with the principles and features disclosed herein. The word "exemplary" or "example" is used herein to mean "serving as an example, instance, or illustration." Any aspect or embodiment described herein as "exemplary"

or as an "example" in not necessarily to be construed as preferred or advantageous over other aspects or embodiments.

The present disclosure addresses the issues of conventional paper toilet seat covers by providing a biodegradable magnetic toilet seat cover. The biodegradable magnetic toilet seat cover can have the following benefits and advantages: 1) it is made of flushable, dispersible, and biodegradable material that is environmentally friendly; 2) it may be placed onto a toilet seat easily and preventing the user from coming into direct contact with the toilet seat; 3) it may be affixed on the surface of the toilet seat without slipping; 4) it may optionally include an anti-splashing flap for preventing soil water from splashing upward to the user's skin; 5) any residual liquid on the toilet seat cannot permeate the biodegradable magnetic toilet seat cover to reach the user's skin; 6) the biodegradable magnetic toilet seat cover can be flushed down the toilet; and 7) last but not least, the biodegradable magnetic toilet seat cover is made from materials that can break down in sewage water treatment system without clogging and without harming the environment. In conjunction with a dispenser, which be configured to provide users with clean and sanitary biodegradable magnetic toilet seat covers automatically. The biodegradable magnetic toilet seat covers can be formed into a roll type without unfolding, thus providing convenience and excellent protection to the user at the same time.

Figure 1B:
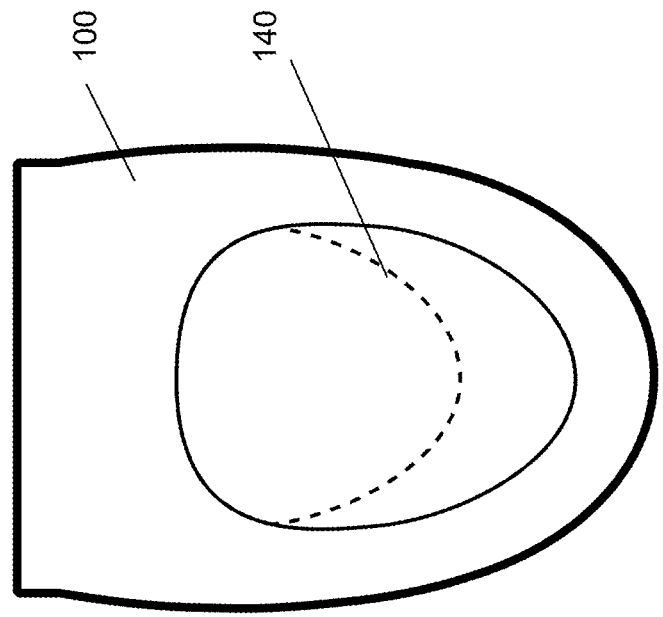
FIG. 1A-1B illustrate a top view of a biodegradable magnetic toilet seat cover according to aspects of the present disclosure.
Figure 1A:
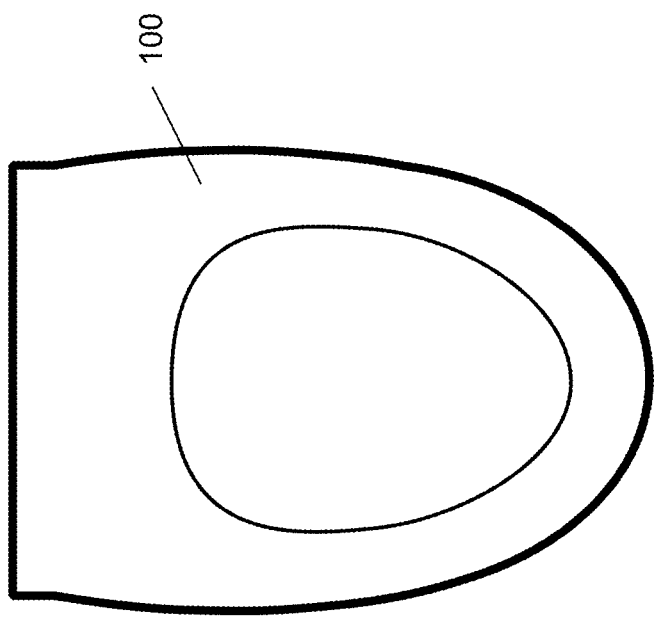

FIG. 1A-1B illustrate a top view of a biodegradable magnetic toilet seat cover according to aspects of the present disclosure. In the example shown in FIG. 1A, a biodegradable magnetic toilet seat cover 100 may have an oval shape. However, the biodegradable magnetic toilet seat cover 100 may be made in other shapes and forms, such as round, elongated, square, rectangular, or other shapes. In other embodiments, the biodegradable magnetic toilet seat cover 100 may be made with larger dimensions so that it can hang over the outer side of the toilet seat. As shown in FIG. 1B, the biodegradable magnetic toilet seat cover 100 may optionally or additionally include an anti-splash flap 140. The anti-splash flap 140 may be attached to the biodegradable magnetic toilet seat cover 100 or may be integrated into one of the layers of the biodegradable magnetic toilet seat cover 100, which will be described below in association with FIG. 2A-2D. The anti-splash flap 140 is used to prevent soil water from splashing upward to the user's skin. According to aspects of the present disclosure, the biodegradable magnetic toilet seat cover may be broken down chemically by bacteria in the natural environment such as sewage and landfill.

According to aspects of the present disclosure, the biodegradable magnetic toilet seat cover is a water impermeable film for preventing residual soiling water to reach user's skin. The water impermeable film may be a hydrophobic materials or thin film which can be made partially, or completely impermeable by the water molecules. In applications where the toilet seat is made of magnetic materials such as iron, nickel, cobalt, or ferrous ferric oxide, the biodegradable magnetic toilet seat cover may be attached to the toilet seat directly. In applications where the toilet seat is made of plastic, wood, or other non-ferromagnetic materials, a set of flexible self-adhesive magnetic pads with a field strength in the range of about 50 to 150 Gauss may be attached to the bottom or top of the toilet seat to create a sufficient magnetic attraction to hold the biodegradable magnetic toilet seat cover to the toilet seat, and to pull the biodegradable magnetic toilet seat cover away from the toilet seat when the toilet is flushed.

Figure 2B:
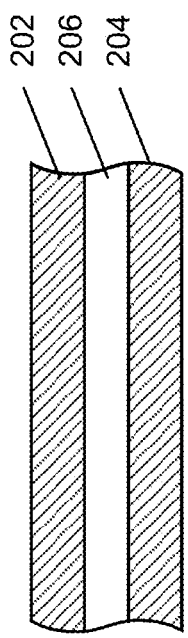

FIG. 2A-2D illustrate cross sectional views of a biodegradable magnetic toilet seat cover according to aspects of the present disclosure. FIG. 2B is a cross-sectional view of the biodegradable magnetic toilet seat cover 200 along line A of FIG. 2A. In the example shown in FIG. 2A-2B, an exemplary biodegradable magnetic toilet seat cover 200 may be formed with three layers. A first layer 202, also referred to as the top layer, is formed with a flushable, dispersible, and biodegradable material such as machine grazed paper, tissue paper, or viscose spunlace non-woven film. A second layer 204, also referred to as the bottom layer, is formed with a water soluble plastic film, such as polyvinyl alcohol (PVA), starch, or carboxymethyl cellulose (CMC), $(C_6H_7O_2(OH)_x(OCH_2COOH)_y)_n$ etc. A third layer 206, also referred to as the middle layer, may be formed with water soluble adhesive such as polyvinyl alcohol adhesive, water soluble polyacrylate $(C_3H_3NaO_2)_n$, or pressure sensitive adhesive may be used to bind top layer and bottom layer together into a water impermeable sheet. The cover 100 comprises an inner center anti splashing flap 140 positioned at the rear central part of the toilet seat which extends inwardly to the toilet bowl.

Figure 2A:
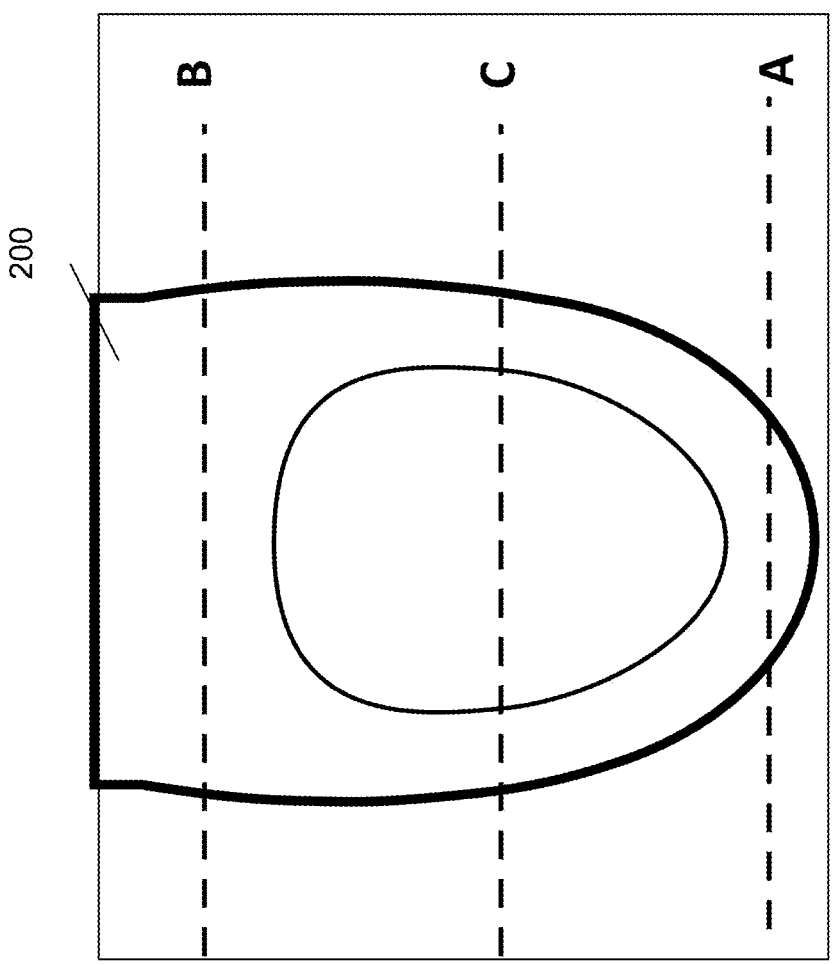

FIG. 2C is a cross-sectional view of the biodegradable magnetic toilet seat cover 200 along line B of FIG. 2A. Similar to FIG. 2B, the biodegradable magnetic toilet seat cover 200 includes a first layer 212, a second layer 214, and a third layer 216.

According to aspects of the present disclosure, the first layer 212 of the biodegradable magnetic toilet seat cover 200 may be formed with tissue paper, machine glazed paper, waxed paper, as well as synthetic fiber non-woven film such as a biodegradable spunlace non-woven film which is formed by mixing a 30 to 45 percent of weight of viscose and a 60 to 70 percent of weight of wood pulp. After flushing down the toilet, the first layer 212 can be broken down in sewage water treatment without causing clogging problems.

The second layer 214 of the biodegradable magnetic toilet seat cover 200 may be formed with a semi-permeable film which may be formed by mixing a 60 to 70 percent of weight of partially hydrolyzed polyvinyl alcohol, a 20 to 30 percent of weight of starch, and a 5 to 10 percent of weight of carboxymethyl cellulose with traces of plasticizer. After flushing down the toilet, the second layer 214 can be dissolved and dispersed in the sewage water.

The third layer 216 of the of the biodegradable magnetic toilet seat cover 200 may be formed with a water soluble ferromagnetic adhesive film which may be formed by mixing an adhesive resin and ferromagnetic materials, where the adhesive resin may include partially hydrolyzed polyvinyl alcohols adhesive, and where the ferromagnetic materials may include ferrous ferric oxide $Fe_3O_4$, nickel Ni, or cobalt Co etc.

In some implementations, the low molecular weight, partially hydrolyzed polyvinyl alcohols adhesive can be made of a water soluble polyvinyl alcohol with a degree of hydrolysis in the range of 70% to 86%, preferably about 80% to 85%, and an approximately 4% percent aqueous solution having a viscosity at 20° C. in the range of about 3 to 45 centipoises.

In one particular implementation, the water soluble ferromagnetic adhesive film may be adhered to the rear section at selected spots, or along both side sections of the biodegradable magnetic toilet seat cover 200. The magnetic force generated between the water soluble ferromagnetic adhesive film and magnetic toilet seat can assist the user to place the biodegradable magnetic toilet seat cover 200 on a magnetic toilet seat (not shown). After flushing, the third layer 216 of polyvinyl alcohol adhesive may be dissolved and dispersed into sewage water.

FIG. 2D is a cross-sectional view of the biodegradable magnetic toilet seat cover 200 along line C of FIG. 2A. Similar to FIG. 2B, the biodegradable magnetic toilet seat cover 200 includes a first layer 222, a second layer 224, and a third layer 224. According to aspects of the present disclosure, the third layer 224 of the water soluble ferromagnetic adhesive film may also include a water soluble magnetic coating which makes from suitable low molecular weight, partially hydrolyzed polyvinyl alcohols binder, for the practice of this disclosure can be 70-86, preferably 80-85, mole percentage hydrolyzed and ferromagnetic powders such as iron, nickel and cobalt, ferrous ferric oxide, $Fe_3O_4$ as well as silica powder pigment etc., The water soluble ferromagnetic coating may be spot coated on the rear section, along both of side sections, or on the bottom layer of the toilet seat cover. After flushing, the third layer 226 of polyvinyl alcohol binder may be dissolved and dispersed in sewage water.

According to aspects of the present disclosure the biodegradable magnetic toilet seat cover may also be a two layer structure comprising a top layer formed of biodegradable tissue paper, and on the both side sections of the bottom surface of the top layer is substantially spot bonding with a two centimeter wide water-soluble ferromagnetic adhesive film or pressure sensitive ferromagnetic adhesive film. In some applications, the surface area of the ferromagnetic adhesive film can be in the range of 5 $cm^2$ to 100 $cm^2$ to generate the appropriate magnetic strength. The water soluble ferromagnetic adhesive film can improve the mechanic strength of the toilet seat cover as well as assist the user to place the biodegradable magnetic toilet seat cover on a magnetized toilet seat. In addition, the biodegradable magnetic toilet seat cover can provide as a barrier for preventing a limited amount of residue liquid on the toilet seat to permeate to the top layer of the covering sheet.

Figure 3D:
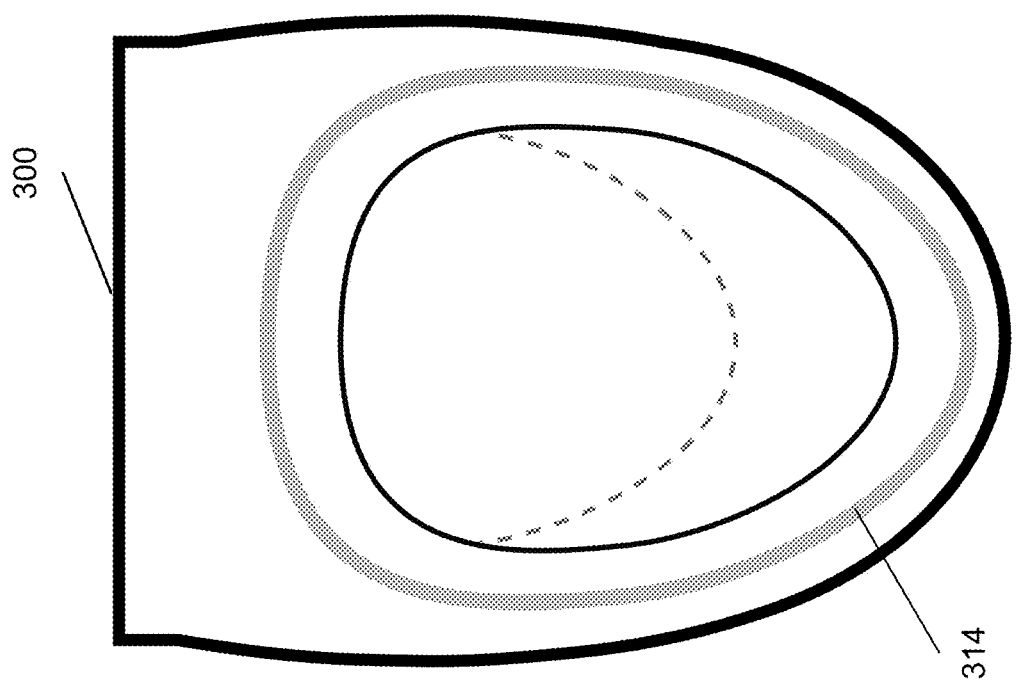

FIG. 3A-3D illustrate exemplary implementations of a biodegradable magnetic toilet seat cover according to aspects of the present disclosure. In FIG. 3B, a cross-sectional view of the biodegradable magnetic toilet seat cover 300 is shown. In particular, the bottom surface 303 of the biodegradable magnetic toilet seat cover 300 may be coated with two strips (302 and 304) of water soluble ferromagnetic adhesive coatings, which may include ferromagnetic powder such as ferrous ferric oxide.

Figure 3C:
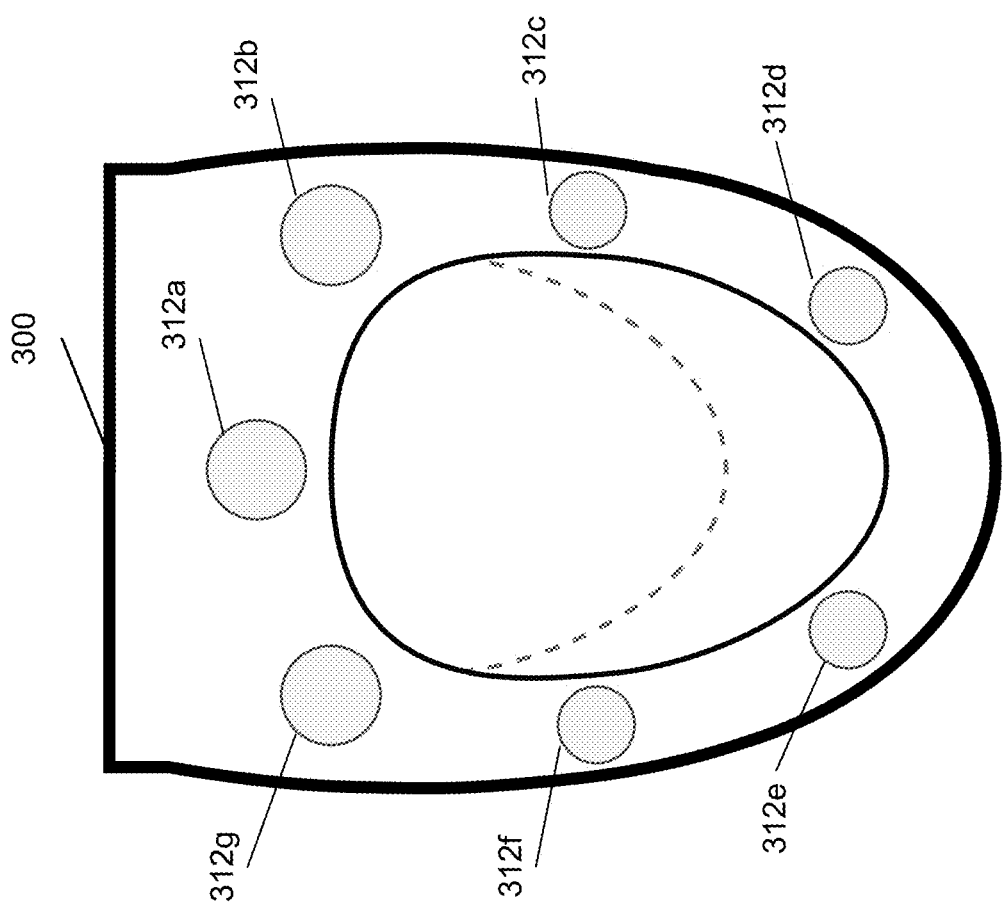

In FIG. 3C, instead of the two strips of water soluble ferromagnetic adhesive coatings as shown in FIG. 3B, this particular implementation uses multiple circular spots of water soluble ferromagnetic adhesive coating (312a to 312g) to hold the biodegradable magnetic toilet seat cover 300 to a toilet seat. Similarly in FIG. 3D, instead of the two strips of water soluble ferromagnetic adhesive coatings as shown in FIG. 3B, this particular implementation uses an oval-shaped water soluble ferromagnetic adhesive coating 314 to hold the biodegradable magnetic toilet seat cover 300 to a magnetic toilet seat.

FIG. 4A-4D illustrate accessories that may assist a user to place a biodegradable magnetic toilet seat cover or a conventional toilet seat cover onto a toilet seat according to aspects of the present disclosure.

Figure 4B:
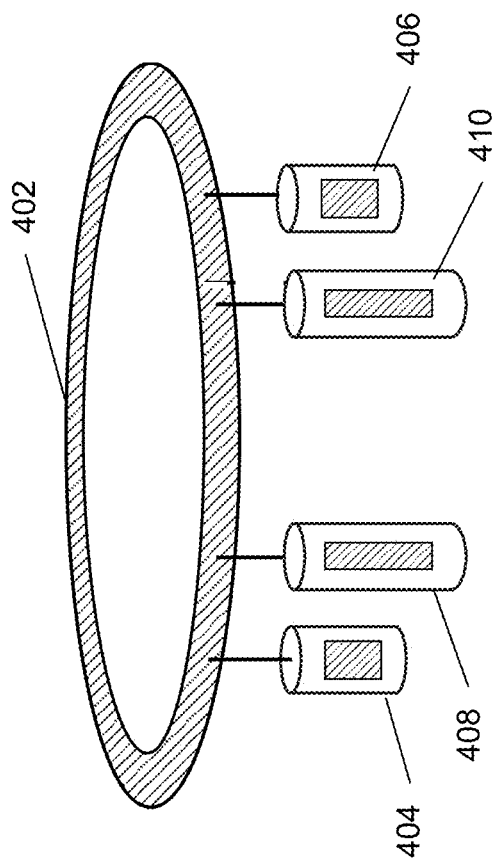
FIG. 4A-4D illustrate accessories that may assist a user to place a biodegradable magnetic toilet seat cover or a conventional toilet seat cover onto a toilet seat according to aspects of the present disclosure.
Figure 4A:
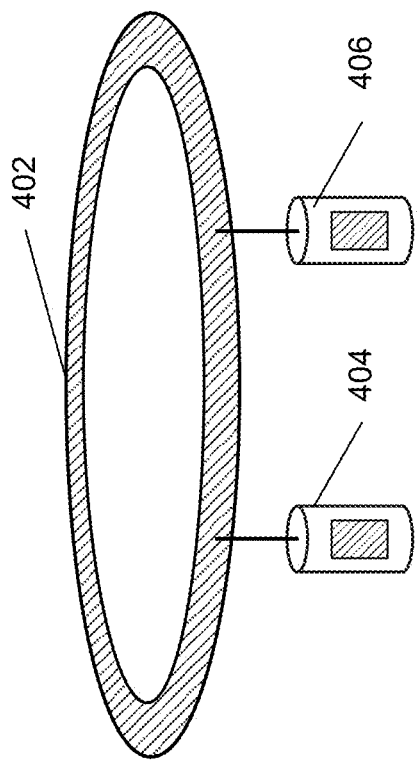
Figure 4D:
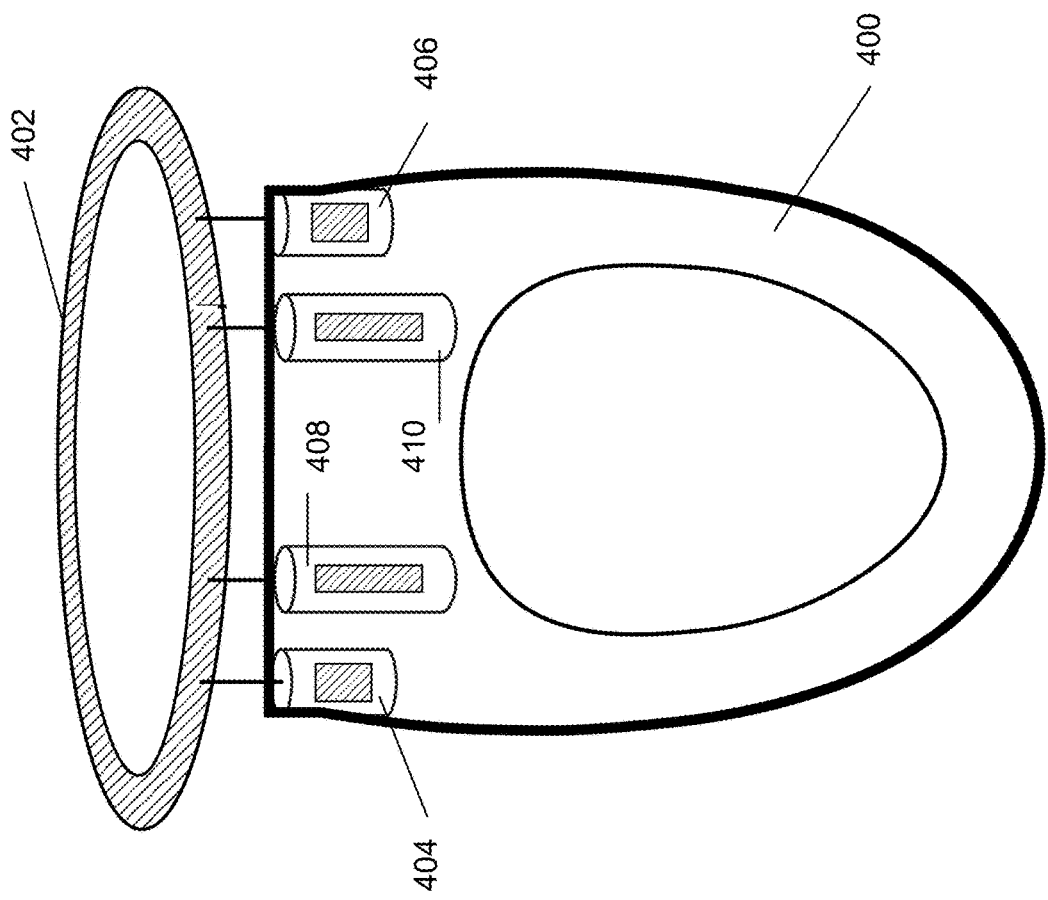
Figure 4C:
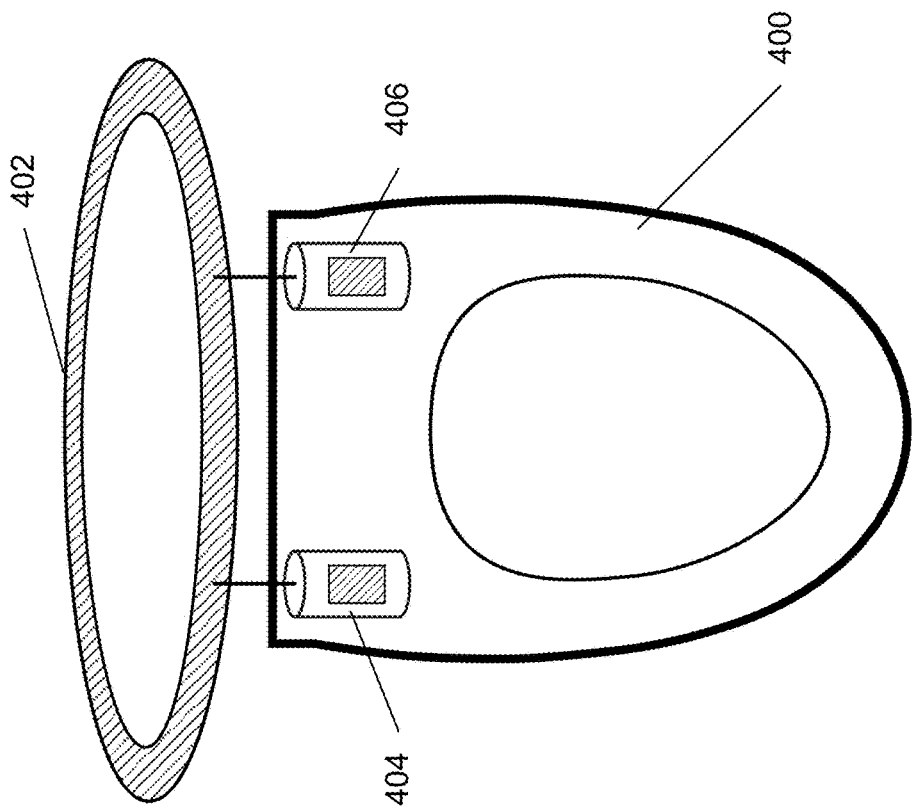

In FIG. 4A, an exemplary implementation of a perspective view of the self-adhesive devices for placing and adhering a biodegradable magnetic toilet seat cover onto the surface of the toilet seat is shown. In this particular implementation, the accessories may include: 1) a belt 402; and 2) a pair of finger gloves (404 and 406). FIG. 4C illustrates an example of using the belt 402 and the pair of finger gloves (404 and 406) to place a biodegradable magnetic toilet seat cover 400 onto a toilet seat according to aspects of the present disclosure.

In FIG. 4B, another implementation of a perspective view of the self-adhesive devices for placing and adhering a conventional toilet seat cover onto the surface of the toilet seat is shown. In this particular implementation, the accessories may include: 1) a belt 402; and 2) a plurality of finger gloves (404, 406, 408 and 410). FIG. 4D illustrates an example of using the belt 402 and the pair of finger gloves (404, 406, 408 and 410) to place a conventional toilet seat cover 400 onto a toilet seat according to aspects of the present disclosure.

As shown in FIG. 4D, the plurality of finger gloves include a pair of magnet thumb gloves which may be made of warm water soluble polyvinyl alcohol thin film and a pair of ferromagnetic middle finger gloves, which may be made of cold water soluble polyvinyl alcohol thin film that is soluble at room temperature. The finger gloves are used for grabbing the rear section of a sheet of the conventional toilet seat cover. One exemplary embodiment of the finger gloves usage is described as follows. When the user put a left thumb into the left magnet thumb glove and a right thumb into the right magnet thumb glove, then put a left middle finger into the left side ferromagnetic middle finger glove and a right middle finger thumb into the right side ferromagnetic middle finger glove; the user may put the left thumb glove on the upper left side of the rear section of the toilet seat cover and the left middle finger glove on the lower left side of the rear section of the toilet seat cover, and also the user may put the right thumb glove on the upper right side of the rear section of the toilet seat cover and the right middle finger on the lower right side of the rear section of the toilet seat cover, then using both of the thumbs and middle fingers to pull one sheet of conventional toilet seat cover out of a dispenser The magnetic field created between of the magnetic thumb gloves and the ferromagnetic middle finger gloves that can be used to hold the conventional toilet seat cover upright on the magnetic waist belt. The user may then release the fingers from the gloves and magnetic force can still keep the toilet seat cover sit on the belt. The user may then hold the right end of the belt across the user's abdomen, in front of the user with the user's right hand, wrap the other end of the belt behind the user and around the user's waist with the user's left hand, and pull both ends to tight the belt. When the belt is tied, the rear section of the conventional toilet seat cover may be held on the user's waist and the conventional toilet seat cover can adhere around the user's butt and thighs, then using the user's right hand to grab the right front side of the toilet seat cover and the user's left hand to grab the left front side of the covering sheet for holding the toilet seat cover to completely cover the user's butt, thighs and upper legs, now the user can sit down in the user's leisure. Once seated, the user's weight can further help to keep the conventional toilet seat cover in place on the toilet seat, then the user can release the rear section of the conventional toilet seat cover from the hanging gloves of the magnetic waist belt. After finish using the conventional toilet seat cover, the flushing water can pull the conventional toilet seat cover into the toilet bowl and it will be dissolved and dispersed in the sewage.

According to aspects of the present disclosure, a magnetic waist belt may have a pair of hanging magnetic thumb gloves which are fixed on both side sections of rear waist as the waist belt be tied. The magnetic waist belt can be configured to work with the biodegradable magnetic toilet seat cover as shown in FIG. 4C. In some implementations, the rear section of each sheet of the biodegradable magnetic toilet seat cover sheet may be coated with a water soluble flexible ferromagnetic adhesive film which includes ferrous ferric oxide ferromagnetic pigment. When a user put a left thumb into the left magnetic thumb glove and a right thumb into the right magnetic thumb glove then the user can put the left thumb glove on the upper left side of the rear section of the biodegradable magnetic toilet seat cover and the left middle finger on the lower left side of the rear section of the biodegradable magnetic toilet seat cover, and also the user can put the right magnetic thumb glove on the upper right side of the rear section of the biodegradable magnetic toilet seat cover and the right middle finger on the lower right side of the rear section of the biodegradable magnetic toilet seat cover, then using both of the thumbs and middle fingers to pull one sheet of biodegradable magnetic toilet seat cover out of a dispenser. The magnetic field created between of the magnetic thumb gloves and rear section of the ferromagnetic toilet seat cover that can be used to hold the biodegradable magnetic toilet seat cover upright on the magnetic waist belt. The user may then release the thumbs from the thumb gloves and magnetic force can still keep the toilet seat cover sit on the belt. The user may then hold the right end of the belt across the user's abdomen, in front of the user with the user's right hand, wrap the other end of the belt behind the user and around the user's waist with the user's left hand, and pull both ends to tight the belt. When the belt is tied, the rear side of the biodegradable magnetic toilet seat cover may be held on the user's waist and the biodegradable magnet toilet seat cover can adhere around the user's butt and thighs, then using the user's right hand to grab the right front side of the toilet seat cover and the user's left hand to grab the left front side of the covering sheet for holding the toilet seat cover to completely cover the user's butt, thighs and upper legs, now the user can sit down in the user's leisure. Once seated, the user's weight can further help to keep the biodegradable magnetic toilet seat cover in place on the toilet seat, then the user can release the rear section of the biodegradable magnetic toilet seat cover from the hanging thumb gloves of the magnetic waist belt. After finish using the biodegradable magnetic toilet seat cover, the flushing water can pull the biodegradable magnetic toilet seat cover into the toilet bowl and it will be dissolved and dispersed in the sewage.

In some implementations, the magnetic waist belt can be extended to a type of magnetic waist belt which can be configured to work with the conventional toilet seat cover paper. The magnetic waist belt may have two type of hanging stripes: 1) a pair of magnetic style hanging stripes which have a upper ring for attaching the hanging stripe to the waist belt and the lower end of the hanging strip have attached the magnetic thumb glove, the hanging magnetic thumb gloves may have flexible magnetic pads in various dimensions and shapes which can be adhered to the inner surface of the thumb gloves; and 2) a pair of ferromagnetic style hanging stripes which may include a upper ring for attaching the hanging stripe to the waist belt and the lower end of the hanging strip have attached the ferromagnetic middle finger glove, and the inner surface of the magnetic hanging middle finger gloves were coated with a thin film of ferrous ferric oxide ferromagnetic coating. The hanging stripes are located at both side sections of rear waist as the waist belt be tied, now the user using both of the thumb gloves and middle finger gloves to pull one sheet of conventional toilet seat cover paper out of the dispenser and the magnetic field created between of the magnetic thumb gloves and the ferromagnetic middle finger gloves that can be used to hold the conventional toilet seat cover paper upright on the waist belt, now the user can sit down in the user's leisure, once seated the user's weight can keep the conventional toilet seat cover in the right place on the toilet seat.

In some implementations, a portable glove style toilet seat cover magnetic adhesive device may be made of poly silicone rubber, poly vinyl alcohol, and poly ethylene etc., that include a left thumb glove, a right thumb glove, a left middle finger glove and a right middle finger glove, where the flexible magnetic pads in various dimensions and shapes may be adhered to the inner side of the thumb gloves, as well as the flexible ferromagnetic adhesive ferrous ferric oxide $Fe_3O_4$ coating films may be coated on the inner surface of both of right hand and left hand middle finger gloves, this kind of the magnetic adhesive device can be used to hold the conventional toilet seat cover paper which do not have a flexible ferromagnetic coating. The user put a left thumb into the left thumb glove and a right thumb into the right thumb glove, and put the left middle finger into the left middle finger glove and the right middle finger into the right middle finger glove. Then the user put the left thumb glove on a first side of the conventional toilet seat cover and the left middle finger glove on a second side of the conventional toilet seat cover for grabbing the left middle side section of the conventional toilet seat cover paper and put the right thumb glove on the first side of the conventional toilet seat cover and the right middle finger glove on the second side of the conventional toilet seat cover for grabbing the right middle side section of the conventional toilet seat cover paper, now the user can pull one sheet of conventional toilet seat cover paper out of the dispenser. The magnetic field created between of the magnetic thumb glove and biodegradable ferromagnetic middle finger glove that can be used to hold the conventional toilet seat cover paper then the user can lay the conventional toilet seat cover paper down on the conventional toilet seat and be sure the second side down, the user can release the user's hands from the gloves, and the gravity of the magnetic adhesive device can keep the conventional toilet seat cover sat on the toilet seat, the user may then sit down. Note that, once seated the user's weight can keep the cover paper in place now the user can detached the thumb gloves from the conventional toilet seat cover that the thumb gloves can be reused, when the user are finished the user can stand up and flush, the flushing water can pull the conventional toilet seat cover paper as well as biodegradable middle finger gloves into the bowl.

In some implementations, the accessories may include a non-magnetic adhesive style waist belt, the adhesive style waist belt has a pair of hanging stripes which have a upper ring for attaching the hanging stripe to the waist belt and the lower end of the hanging strip have attached two piece of plastic films 1) one piece of plastic film is coated with pressure sensitive adhesive; 2) the other piece is a release plastic film for jointing the adhesive plastic film which used as a release liner to protect the adhesive. These two hanging stripes are located on both side sections of rear waist as the waist belt be tied. Once the release liner is removed the pressure sensitive adhesive may then be used, now using the user's hands to hold the rear side of the conventional toilet seat cover paper and press the cover paper onto the pressure sensitive adhesive plastic films for holding the conventional toilet seat cover upright on the non-magnetic waist belt, now the user can sit down in the user's leisure, once seated the user's weight can keep the conventional toilet seat cover in the right place on the toilet seat.

According to aspects of the present disclosure, the glove style toilet seat cover magnetic adhesive device may be extended to a glove style seat cover non-magnetic adhesive device which comprises two kinds of biodegradable gloves: 1) a pair of thumb gloves which have water weight bags; and 2) a pair of flushable middle finger gloves. Using thumb gloves and middle finger gloves to hold and place the conventional toilet seat cover on the toilet seat then the gravity force of the weight bag can press conventional toilet seat cover paper to firmly adhere on the toilet seat. A portable plastic bag (e.g. having a size of 3 cm×4 cm×0.3 cm), such as a water filled rectangle bag made of hot water soluble poly vinyl alcohol that can be used as the weight bag. The used flushable middle finger gloves and conventional toilet seat cover paper can flush into toilet.

Figure 5B:
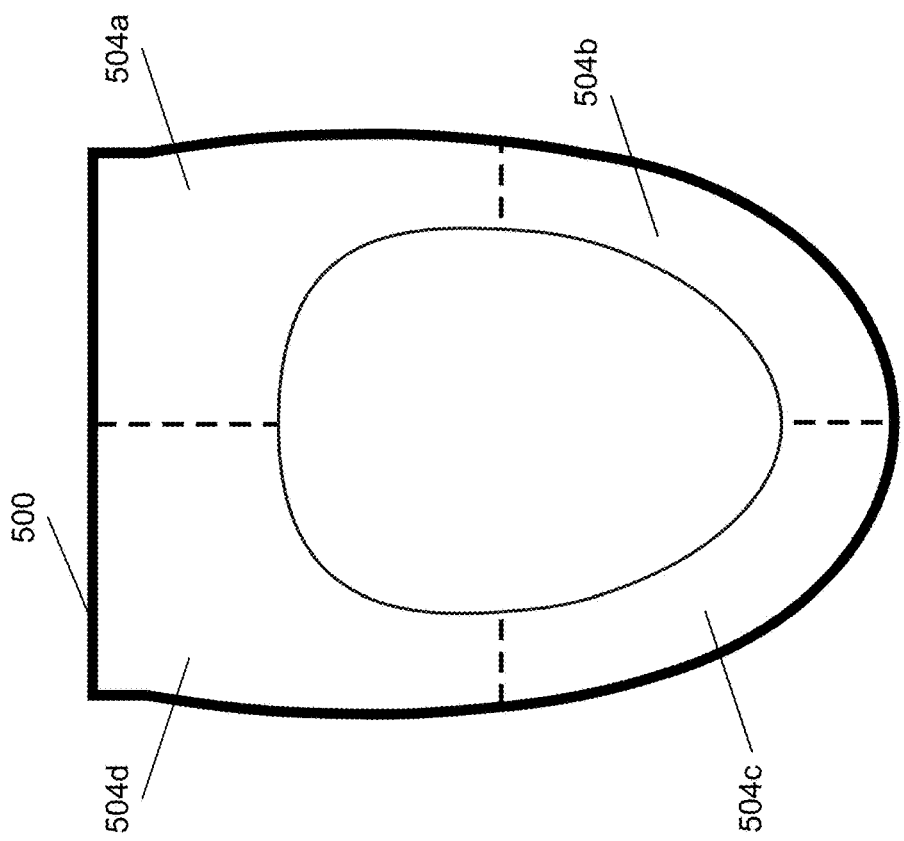
FIG. 5A-5B illustrate implementations of a reusable, portable and flexible auxiliary magnetic toilet seat pad according to aspects of the present disclosure.
Figure 5A:
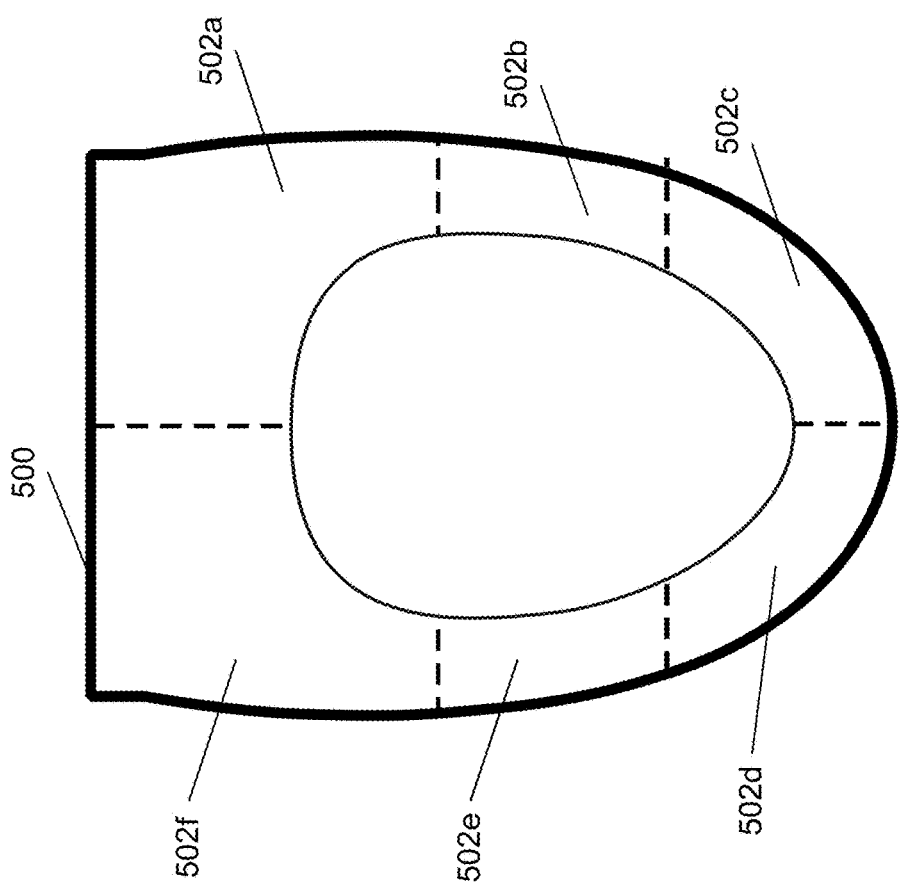

FIG. 5A-5B illustrate implementations of a reusable, portable and flexible auxiliary magnetic toilet seat pad according to aspects of the present disclosure. FIG. 5A illustrates a top view of a reusable, portable and flexible auxiliary magnetic toilet seat pad 500 that made of poly silicon rubber magnetic pad or poly vinyl rubber magnetic pad which can fit a standard toilet seat. The flexible auxiliary magnetic toilet seat pad 500 can be 1 to 4 mm, preferably 1.5 mm thick and has the contour and shape of the biodegradable magnetic toilet seat cover 100. In some implementations, the outer peripheral size of the toilet seat pad 300 is 1 cm smaller than the biodegradable magnetic toilet seat cover 100 as well as the central oval shaped opening section size is 1 cm larger than covering sheet that is configured for a user to sit on, for the purpose of protecting a user from an unsanitary and bare toilet seat. The magnetic force created from the auxiliary magnetic toilet seat pad 500 can removable adhere one sheet of the biodegradable magnetic toilet seat cover 100 on their top surface as well as another sheet of the biodegradable magnetic toilet seat cover on their bottom surface. Then both of auxiliary seat pad 500 and biodegradable magnet toilet seat cover 100 can be folded together to its final one sixth fold travel size as shown in FIG. 5A. First fold the auxiliary magnetic toilet seat pad in half along the vertical central folding line, then one sixth fold is created by horizontal folding the two ends of a half fold toilet seat pad inward so that the edges meet in the middle, represented by sections 502a to 502f. Now an auxiliary magnetic toilet seat pad 34 cm×42 cm toilet seat is folded to 17 cm×14 cm. When in use, a user may unfold said magnetic toilet seat pad 500 and biodegradable magnetic toilet seat cover 100 for placing on the toilet seat. Using the biodegradable magnetic toilet seat cover 100 can keep the auxiliary magnetic toilet seat pad 500 clean so as not to be in contact with the soiling and germs on the toilet seat.

In the example shown in FIG. 5B, the auxiliary seat pad 500 and biodegradable magnet toilet seat cover 100 can be folded together to its final one fourth fold travel size as shown in FIG. 5B. First fold the auxiliary magnetic toilet seat pad in half along the vertical central folding line, then one fourth fold is created by horizontal folding the two ends of a half fold toilet seat pad inward so that the edges meet in the middle, represented by sections 504a to 502d. When in use, a user may unfold said magnetic toilet seat pad 500 and biodegradable magnetic toilet seat cover 100 for placing on the toilet seat. Using the biodegradable magnetic toilet seat cover 100 can keep the auxiliary magnetic toilet seat pad 500 clean so as not to be in contact with the soiling and germs on the toilet seat.

According to aspects of the present disclosure, a roll, for example with 100 sheets of dispersible, biodegradable magnetic toilet seat cover can be designed to match the contour and shape of the top surface of a type of the toilet seat, but has larger dimensions so that it can cover the toilet seat that is configured for a user to sit on. The biodegradable magnetic toilet seat cover may have two or more layers including a top layer formed of a light-weight biodegradable paper such as a tissue paper or a biodegradable non-woven film, a base layer formed of a water soluble film and a middle thin layer of water-soluble ferromagnetic adhesive which can be used to bond the top layer and the bottom layer together for forming a water impermeable ferromagnetic thin film. The bonding spot diameter may be around 0.5 cm to 1 cm for the dispersal of the bonded film in water. The thin film can be used to make one sixth folded biodegradable magnetic toilet seat covers and a roll of biodegradable magnetic toilet seat covers. The biodegradable magnetic toilet seat cover can be dissolved and decomposed in the sewage water treatment system. In such a way, the biodegradable magnetic toilet seat cover is an environmental friendly product.

According to aspects of the present disclosure, adhesive devices may be used to press and hold the biodegradable magnetic toilet seat cover or conventional toilet seat cover onto the toilet seat. A pocket type thumb glove with a packet (e.g. with size 5.5 cm×4.5 cm×0.5 cm) which may be made of thin film of poly silicone rubber, poly vinyl alcohol, poly lactic acid, poly ethylene etc. Inside the pocket of the thumb glove, it may include: 1) a weight bag (e.g. with size 3 cm×4 cm×0.3 cm), such as a water weight bag made of hot water soluble poly vinyl alcohol, or a weight bag filled with a piece of jade, a piece of gold and a piece of plastic material etc.; 2) two sheets of one fourth fold 2 ply tissue paper (e.g. with size 5 cm×5.5 cm). Because the fold tissue paper can be longer than the packet so it can be pulled out of the pocket for usage. The adhesive device includes a pair of pocket type thumb gloves, and a pair of biodegradable middle finger gloves. Using thumb gloves and middle finger gloves to hold the middle sections of the biodegradable magnetic toilet seat cover and place on the toilet seat. Then, the weight bag of the pocket type thumb gloves can press the biodegradable magnetic toilet seat cover to firmly adhere on the toilet seat. The biodegradable middle finger gloves and the biodegradable magnetic toilet seat cover can be flushed into toilet. This portable device can provide better sanitary protection to the users.

In some implementations, a portable and flexible auxiliary magnetic toilet seat pad that made of poly silicon rubber magnetic pad or poly vinyl rubber magnetic pad which can fit a standard toilet seat. The flexible auxiliary magnetic toilet seat pad can be 1 to 4 mm, preferably 1.5 mm thick which has the contour and shape of the biodegradable magnetic toilet seat cover, but the outer peripheral size of the toilet seat pad is 1 cm smaller than covering sheet as well as the central oval shaped opening section size is 1 cm larger than covering sheet that is configured for a user to sit there on for the purpose of protecting a user from an unsanitary and bare toilet seat and the magnetic force created from the auxiliary magnetic toilet seat pad can removable adhere one sheet of the biodegradable magnetic toilet seat cover on their top surface as well as another sheet of the biodegradable magnetic toilet seat cover on their bottom surface. Then both of auxiliary seat pad and biodegradable magnet toilet seat cover can fold together to its final one sixth fold packet size. When in use, a user may unfold said magnetic toilet seat pad and biodegradable magnetic toilet seat cover for placing on the toilet seat. Poly silicon rubber magnetic pad or poly vinyl rubber magnetic pad may be used to develop a magnetic toilet seat.

Figure 6A:
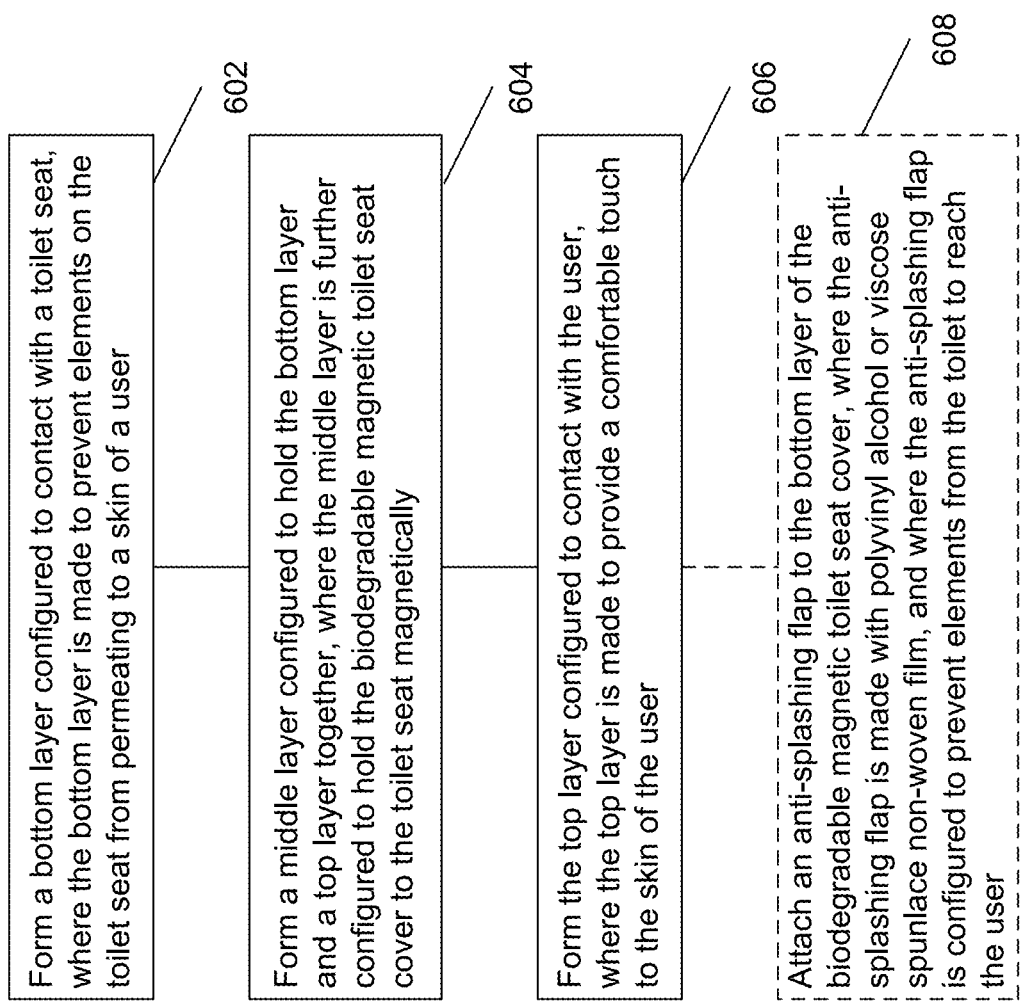
FIG. 6A illustrates an exemplary method of manufacturing a biodegradable magnetic toilet seat cover according to aspects of the present disclosure.

FIG. 6A illustrates an exemplary method of manufacturing a biodegradable magnetic toilet seat cover according to aspects of the present disclosure. As shown in FIG. 6A, in block 602 the method forms a bottom layer configured to contact with a toilet seat, where the bottom layer is made to prevent elements on the toilet seat from permeating to a skin of a user. In block 604, the method forms a middle layer configured to hold the bottom layer and a top layer together, where the middle layer is further configured to hold the biodegradable magnetic toilet seat cover to the toilet seat magnetically. In block 606, the method forms the top layer configured to contact with the user, where the top layer is made to provide a comfortable touch to the skin of the user.

According to aspects of the present disclosure, the methods performed in blocks 602 to 606 may additionally or optionally include the method performed in block 608. In block 608, the method attaches an anti-splashing flap to the bottom layer of the biodegradable magnetic toilet seat cover, where the anti-splashing flap is made with polyvinyl alcohol or viscose spunlace non-woven film, and where the anti-splashing flap is configured to prevent elements from the toilet to reach the user. In some implementations, the anti-splashing flap may be integrated with the bottom layer as one piece.

According to aspects of the present disclosure, a set of magnets may be attached to the toilet seat with a field strength in the range of about 50 to 150 Gauss, and where the magnetic attraction between the middle layer and the set of magnet is configured to hold the biodegradable magnetic toilet seat cover in place during use. The biodegradable magnetic toilet seat cover can be pulled away from the toilet seat when the toilet is flushed.

Figures 6B, 6C, 6D:
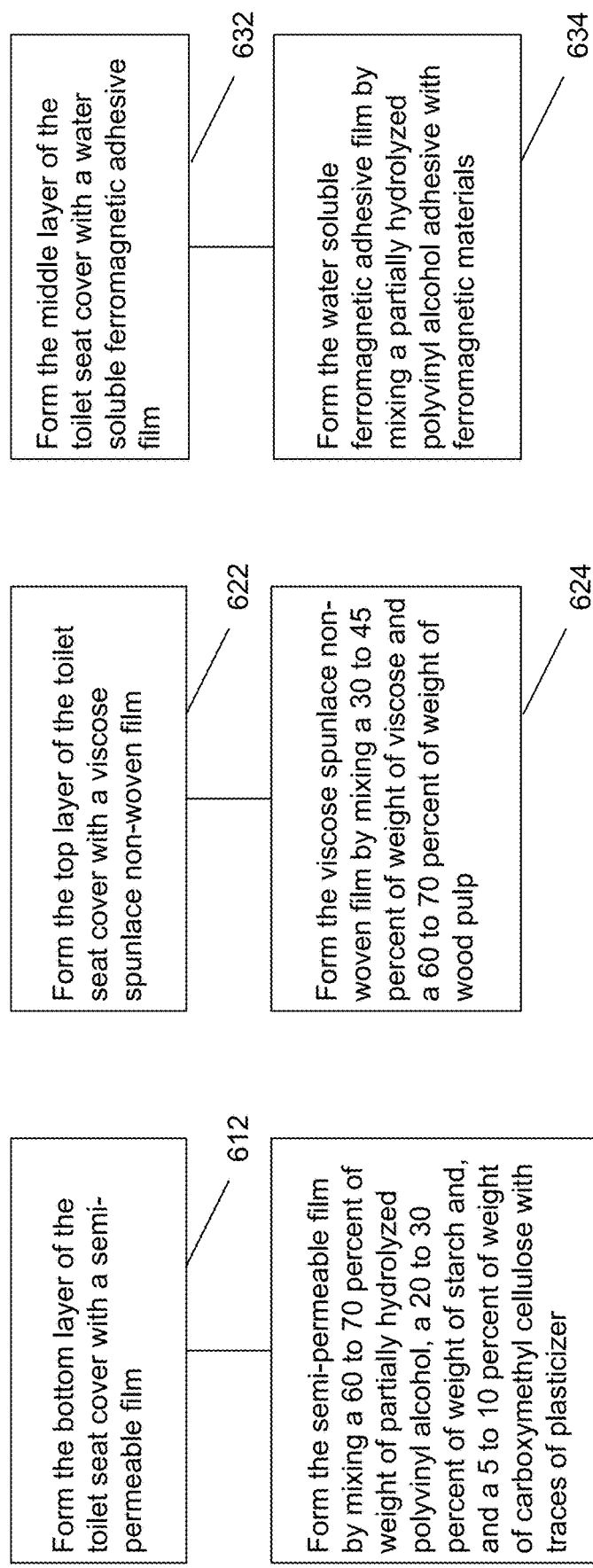
FIG. 6B illustrates an exemplary method of manufacturing a bottom layer of the biodegradable magnetic toilet seat cover according to aspects of the present disclosure.
FIG. 6C illustrates an exemplary method of manufacturing a top layer of the biodegradable magnetic toilet seat cover according to aspects of the present disclosure.
FIG. 6D illustrates an exemplary method of manufacturing a middle layer of the biodegradable magnetic toilet seat cover according to aspects of the present disclosure.

FIG. 6B illustrates an exemplary method of manufacturing a bottom layer of the biodegradable magnetic toilet seat cover according to aspects of the present disclosure. In the example of FIG. 6B, in block 612, the method forms the bottom layer of the toilet seat cover with a semi-permeable film. In some implementations, the method performed in block 612 may further include the method performed in block 614. In block 614, the method forms the semi-permeable film by mixing a 60 to 70 percent of weight of partially hydrolyzed polyvinyl alcohol, a 20 to 30 percent of weight of starch and, and a 5 to 10 percent of weight of carboxymethyl cellulose with traces of plasticizer.

FIG. 6C illustrates an exemplary method of manufacturing a top layer of the biodegradable magnetic toilet seat cover according to aspects of the present disclosure. As shown in FIG. 6C, in block 622, the method forms the top layer of the toilet seat cover with a viscose spunlace non-woven film. In some implementations, the method performed in block 622 may further include the method performed in block 624. In block 624, the method forms the viscose spunlace non-woven film by mixing a 30 to 45 percent of weight of viscose and a 60 to 70 percent of weight of wood pulp.

FIG. 6D illustrates an exemplary method of manufacturing a middle layer of the biodegradable magnetic toilet seat cover according to aspects of the present disclosure. In the example shown in FIG. 6D, in block 632, the method forms the middle layer of the toilet seat cover with a water soluble ferromagnetic adhesive film. In some implementations, the method performed in block 632 may further include the method performed in block 634. In block 634, the method forms the water soluble ferromagnetic adhesive film by mixing a partially hydrolyzed polyvinyl alcohol adhesive with ferromagnetic materials. The partially hydrolyzed polyvinyl alcohol adhesive is composed of a water soluble polyvinyl alcohol having a degree of hydrolysis in the range of 70% to 86%, and an approximately 4% percent aqueous solution having a viscosity at 20° C. in the range of 3 to 45 centipoises. The ferromagnetic materials include ferrous ferric oxide $Fe_3O_4$, nickel, or cobalt.

Figures 7A, 7B:
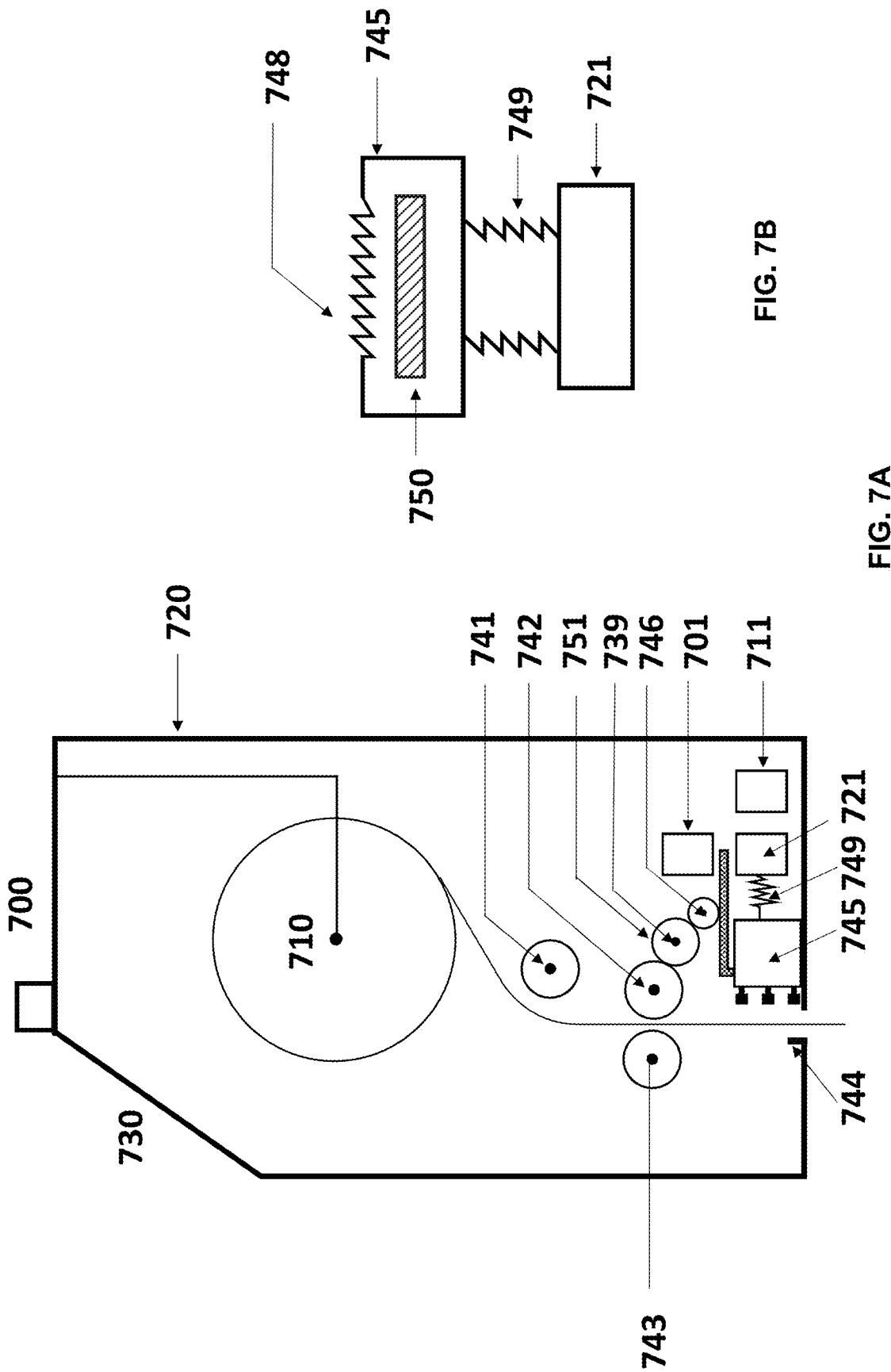
FIG. 7A-7B illustrates an exemplary dispenser of biodegradable magnetic toilet seat covers according to aspects of the present disclosure.

FIG. 7A-7B illustrates an exemplary dispenser of biodegradable magnetic toilet seat covers according to aspects of the present disclosure. As shown in FIG. 7A-7B, an automatic toilet seat cover dispenser and more particularly the "hands free" dispenser 700 can be configured to provide the biodegradable magnetic toilet seat cover 100 from a roll 710 continuously. Toilet seat cover dispenser includes a cabinet 720 configured to receive a roll of the biodegradable magnetic toilet seat cover 100, the loading door 730 is pivotally attached to the cabinet 720 and movable between a closed position and an open position, when the loading door 730 is open, e.g., to add a clean toilet biodegradable magnet toilet seat cover roll 710 in the dispenser 700, a feed and guide system 740 that defines a pathway for the covering sheet, that start from the roll 710 to the guide roller 741 and then downwardly (to pass through a pair of drive roller and the pressure roller 743), the sheet of the supply roll 710 run through the nip between the drive roller 742 and the pressure roller 743 and then continuously run through the dispensing slot 744 and the dispensing door 745 for releasing one sheet of the biodegradable magnetic toilet seat cover. The dispenser 700 includes an electronic control system 701 which further includes a battery pack 711 for supplying power to a control circuitry 721 in order to operate of the dispenser. When a user move a hand in front of the sensing device to activate the control circuitry for starting the motor 739 and gearbox 751 to drive the driving roller 742 to run a predetermined length as well as to drive the track roller 746 to turn one round. The motor as well as the driving roller stop from running as one sheet of toilet seat cover 100 has been dispensed. Upon one sheet of toilet seat cover dispensed to the outside of the dispenser 700 through dispensing slot 744, the track roller may be configured to stop and the spring 749 may be configured to push the dispensing door 745 to the closed position. The cutter 748 and the magnetic pads 750 are located at the inner surface of the dispensing cap which are kept at a normal rest position as the dispensing door is opened and changed to a severing position for tearing off the rear end of the toilet biodegradable magnet toilet seat cover by a serrated edge of a blade 748 and grabbing the cut seat cover by the magnetic pads 750 as the dispensing door is closed. Now the user can grab and pick the toilet biodegradable magnet toilet seat cover for placing the sheet on the toilet seat.

In some implementations, a remote controlling roll type dispenser may be employed in the continuous dispensing sanitary toilet seat cover segments automatically from the sheet roll. This dispenser can be configured to address the problem for people who prefer not to touch dirty items in the public restroom. When the switch is pressed or the sensing device is activated, the control device can open the protect cap which is located at the bottom of the cabinet and one sheet of the biodegradable magnetic toilet seat cover is provided per dispensing cycle as the electric driving motor is activated. A cutter may be moved to the serving position for cutting the rear end of the toilet seat cover as well as the magnetic pad to hold the cut biodegradable magnetic toilet seat cover as the protect cap of the cabinet is closed, to allow the user to grab and tear off the biodegradable magnetic toilet seat cover for use.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the invention to the precise forms disclosed. Many modifications and variations are possible in view of the above teachings. The embodiments were chosen and described to explain the principles of the invention and their practical applications, and to enable others skilled in the art to best utilize the invention and various embodiments with various modifications as suited to the particular use contemplated.

What is claimed is:

1. A biodegradable magnetic toilet seat cover, comprising:
   a bottom layer configured to contact with a toilet seat, wherein the bottom layer is made to prevent elements on the toilet seat from permeating to a skin of a user, wherein the bottom layer of the toilet seat cover is formed with a semi-permeable film, and the semi-permeable film is formed by mixing a 60 to 70 percent of weight of partially hydrolyzed polyvinyl alcohol, a 20 to 30 percent of weight of starch and, and a 5 to 10 percent of weight of carboxymethyl cellulose with traces of plasticizer;
   a top layer configured to contact with the user, wherein the top layer is made to touch the skin of the user; and
   a middle layer configured to hold the bottom layer and the top layer together, wherein the middle layer is further configured to hold the biodegradable magnetic toilet seat cover to the toilet seat magnetically.

2. The biodegradable magnetic toilet seat cover of claim 1, further comprising:
   an anti-splashing flap formed with polyvinyl alcohol or viscose spunlace non-woven film, and wherein the anti-splashing flap is configured to prevent elements from the toilet to reach the user.

3. The biodegradable magnetic toilet seat cover of claim 1,
   wherein a set of magnets is attached to the toilet seat with a field strength in the range of about 50 to 150 Gauss, and wherein the magnetic attraction between the middle layer and the set of magnet is configured to hold the biodegradable magnetic toilet seat cover in place during use; and
   wherein the biodegradable magnetic toilet seat cover is pulled away from the toilet seat when the toilet is flushed.

4. The biodegradable magnetic toilet seat cover of claim 1, wherein the top layer of the toilet seat cover is formed with a viscose spunlace non-woven film.

5. The biodegradable magnetic toilet seat cover of claim 4, wherein
   the viscose spunlace non-woven film is formed by mixing a 30 to 45 percent of weight of viscose and a 60 to 70 percent of weight of wood pulp.

6. The biodegradable magnetic toilet seat cover of claim 1, wherein
   the middle layer of the toilet seat cover is formed with a water soluble ferromagnetic adhesive film.

7. The biodegradable magnetic toilet seat cover of claim 6, wherein
   the water soluble ferromagnetic adhesive film is formed by mixing a partially hydrolyzed polyvinyl alcohol adhesive with ferromagnetic materials; wherein the partially hydrolyzed polyvinyl alcohol adhesive is composed of a water soluble polyvinyl alcohol having a degree of hydrolysis in the range of 70% to 86%, and an approximately 4% percent aqueous solution having a viscosity at 20° C. in the range of 3 to 45 centipoises; and wherein the ferromagnetic materials include ferrous ferric oxide $Fe_3O_4$, nickel, or cobalt.

8. The biodegradable magnetic toilet seat cover of claim 1, wherein
   the biodegradable magnetic toilet seat cover is folded into 6 sub-sections for storage and dispensing; or the biodegradable magnetic toilet seat cover is folded together with an auxiliary magnetic toilet seat pad into 6 sub-sections for storage and dispensing, wherein the auxiliary magnetic toilet seat pad is reusable, portable and flexible.

9. A method of manufacturing a biodegradable magnetic toilet seat cover, comprising:
   forming a bottom layer configured to contact with a toilet seat, wherein the bottom layer is made to prevent elements on the toilet seat from permeating to a skin of a user, comprising forming the bottom layer of the toilet seat cover with a semi-permeable film, and further comprising forming the semi-permeable film by mixing a 60 to 70 percent of weight of partially hydrolyzed polyvinyl alcohol, a 20 to 30 percent of weight of starch and, and a 5 to 10 percent of weight of carboxymethyl cellulose with traces of plasticizer;
   forming a middle layer configured to hold the bottom layer and a top layer together, wherein the middle layer is further configured to hold the biodegradable magnetic toilet seat cover to the toilet seat magnetically; and
   forming the top layer configured to contact with the user, wherein the top layer is made to touch the skin of the user.

10. The method of claim 9, further comprising:
    attaching an anti-splashing flap to the top layer of the biodegradable magnetic toilet seat cover, wherein the anti-splashing flap is formed with polyvinyl alcohol or viscose spunlace non-woven film, and wherein the anti-splashing flap is configured to prevent elements from the toilet to reach the user.

11. The method of claim 9, wherein
    wherein a set of magnets is attached to the toilet seat with a field strength in the range of about 50 to 150 Gauss, and wherein the magnetic attraction between the middle layer and the set of magnet is configured to hold the biodegradable magnetic toilet seat cover in place during use; and
    wherein the biodegradable magnetic toilet seat cover is pulled away from the toilet seat when the toilet is flushed.

12. The method of claim 9, further comprising:
    forming the top layer of the toilet seat cover with a viscose spunlace non-woven film.

13. The method of claim 12, further comprising:
    forming the viscose spunlace non-woven film by mixing a 30 to 45 percent of weight of viscose and a 60 to 70 percent of weight of wood pulp.

14. The method of claim 9, further comprising:
    forming the middle layer of the toilet seat cover with a water soluble ferromagnetic adhesive film.

15. The method of claim 14, further comprising:
forming the water soluble ferromagnetic adhesive film by mixing a partially hydrolyzed polyvinyl alcohol adhesive with ferromagnetic materials; wherein the partially hydrolyzed polyvinyl alcohol adhesive is composed of a water soluble polyvinyl alcohol having a degree of hydrolysis in the range of 70% to 86%, and an approximately 4% percent aqueous solution having a viscosity at 20° C. in the range of 3 to 45 centipoises; and wherein the ferromagnetic materials include ferrous ferric oxide $Fe_3O_4$, nickel, or cobalt.

16. The method claim 9, wherein
the biodegradable magnetic toilet seat cover is folded into 6 sub-sections for storage and dispensing; or the biodegradable magnetic toilet seat cover is folded together with an auxiliary magnetic toilet seat pad into 6 sub-sections for storage and dispensing, wherein the auxiliary magnetic toilet seat pad is reusable, portable and flexible.

17. A biodegradable magnetic toilet seat cover, comprising:
a first layer configured to contact with the user, wherein the first layer is made to touch the skin of the user; and
a second layer configured to hold the second layer and the first layer together, wherein the second layer is further configured to hold the biodegradable magnetic toilet seat cover to a toilet seat magnetically,
wherein the second layer of the toilet seat cover is formed with a water soluble ferromagnetic adhesive film, and
the water soluble ferromagnetic adhesive film is formed by mixing a partially hydrolyzed polyvinyl alcohol adhesive with ferromagnetic materials; wherein the partially hydrolyzed polyvinyl alcohol adhesive is composed of a water soluble polyvinyl alcohol having a degree of hydrolysis in the range of 70% to 86%, and an approximately 4% percent aqueous solution having a viscosity at 20° C. in the range of 3 to 45 centipoises; and wherein the ferromagnetic materials include ferrous ferric oxide $Fe_3O_4$, nickel, or cobalt.

18. The biodegradable magnetic toilet seat cover of claim 17, further comprising:
an anti-splashing flap formed with polyvinyl alcohol or viscose spunlace non-woven film, and wherein the anti-splashing flap is configured to prevent elements from the toilet to reach the user.

19. The biodegradable magnetic toilet seat cover of claim 17,
wherein a set of magnets is attached to the toilet seat with a field strength in the range of about 50 to 150 Gauss, and wherein the magnetic attraction between the second layer and the set of magnet is configured to hold the biodegradable magnetic toilet seat cover in place during use; and
wherein the biodegradable magnetic toilet seat cover is pulled away from the toilet seat when the toilet is flushed.

20. The biodegradable magnetic toilet seat cover of claim 17, wherein
the first layer of the toilet seat cover is formed with a viscose spunlace non-woven film.

21. The biodegradable magnetic toilet seat cover of claim 20, wherein
the viscose spunlace non-woven film is formed by mixing a 30 to 45 percent of weight of viscose and a 60 to 70 percent of weight of wood pulp.

* * * * *